United States Patent Office 3,152,956
Patented Oct. 13, 1964

3,152,956
18,19-DI-NOR-13β-n-PROPYL-17α-ETHYNYL-TES-
TOSTERONE AND PREPARATION THEREOF
Gerard Nomine, Noisy-le-Sec, Robert Bucourt, Clichy-
sous-Bois, and Andre Pierdet, Noisy-le-Sec, France,
assignors to Roussel-UCLAF, S.A., Paris, France, a
corporation of France
No Drawing. Filed Apr. 30, 1962, Ser. No. 191,264
Claims priority, application France, May 10, 1961,
861,446; Aug. 8, 1961, 870,347
10 Claims. (Cl. 167—74)

The invention relates to the novel product, 18,19-di-nor-13β-n-propyl-17α-ethynyl-testosterone having the formula

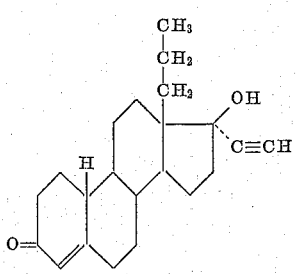

(I)

and to a novel process for the preparation of the said testosterone and the novel intermediates thereof.

18,19-di-nor-13β-n-propyl-17α-ethynyl-testosterone has progestomimetic activity and is utilized by oral, perlingual, transcutaneous or rectal methods. It can be prepared in the form of solutions or injectable suspensions, prepared in ampules, in multiple-dose flacons, in the form of tablets, or glossettes, in the form of suppositories prepared by the usual procedures.

18,19-di-nor-13β-propyl - 17α - ethynyl - testosterone is preferably administered by oral methods. It can be used for the treatment of amenorrhea, hypermenorrhea, metrorrhagia, menorrhagia, sterility, abortions, all hyperfolliculinic manifestations, nervous and psychic symptoms which are due to the above, and insufficient milk flow.

It is an object of the invention to provide the novel product, 18,19-di-nor-13β-n-propyl-17α-ethynyl-testosterone.

It is another object of the invention to provide a novel process for the preparation of 18,19-di-nor-13β-n-propyl-17α-ethynyl-testosterone.

It is an additional object of the invention to provide novel intermediates for the preparation of 18,19-di-nor-13β-n-propyl-17α-ethynyl-testosterone and particularly:
(a) The 3-ketals of 18,19-di-nor-13β-n-propyl-testosterone and its carboxylic acid esters,
(b) The 3-ketals of 13β-n-propyl-Δ⁴-gonene-3,17-dione and
(c) The 3-ketals of 18,19-di-nor-13β-n-propyl-17α-ethynyl-testosterone.

These and other objects and advantages of the invention will become obvious from the following detailed description.

The novel product of the invention has the formula

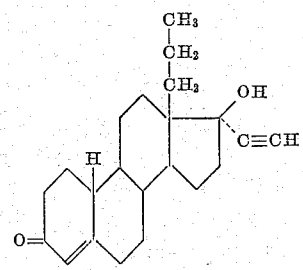

and is particularly useful as an oral progestative. The usual dosage is 5 to 10 mg. per day depending upon the method of administration.

The process of the invention for the preparation of 18,19-di-nor-13β-n-propyl-17α-ethynyl - testosterone comprises reacting 18,19-di-nor-13β-n-propyl-testosterone or a carboxylic acid ester thereof with an alkylene ketalizing agent such as an α-glycol, β-glycol or a dioxolane to form the corresponding 3-alkylene ketal of 18,19-di-nor-13β-n-propyl-testosterone or its carboxylic acid ester, saponifying the latter if the starting material is in the ester form to obtain the 3-alkylene ketal of 18,19-di-nor-13β-n-propyl-testosterone, oxidizing the latter to form the 3-alkylene ketal of 13β-n-propyl-Δ⁴-gonene-3,17-dione, ethynylating the latter to form the 3-alkylene ketal of 18,19-di-nor-13β-n-propyl-17α-ethynyl-testosterone, hydrolyzing the latter under acidic conditions to form 18,19-di-nor-13β-n-propyl-17α-ethynyl-testosterone and recovering the latter.

The ketalization may be effected by the reaction with an α-glycol or a β-glycol or with a dioxolane in the presence of an acid catalyst such as p-toluene sulfonic acid.

The saponification of the 17-ester grouping if it is present may be effected with an alkali metal base in an aqueous or aqueous-alcohol solution. The oxidation step may be effected with an oxidizing agent such as manganese dioxide or chromic acid anhydride or by a double exchange of functions with a ketone such as cyclohexanone in the presence of aluminum isopropylate.

The ethynylation reaction is preferably effected by reaction with a Grignard reagent such as magnesium ethynyl bromide. It may also be effected by reaction with an alkali metal acetylide, but the yields are lower.

The reaction scheme is illustrated in Table I.

TABLE I

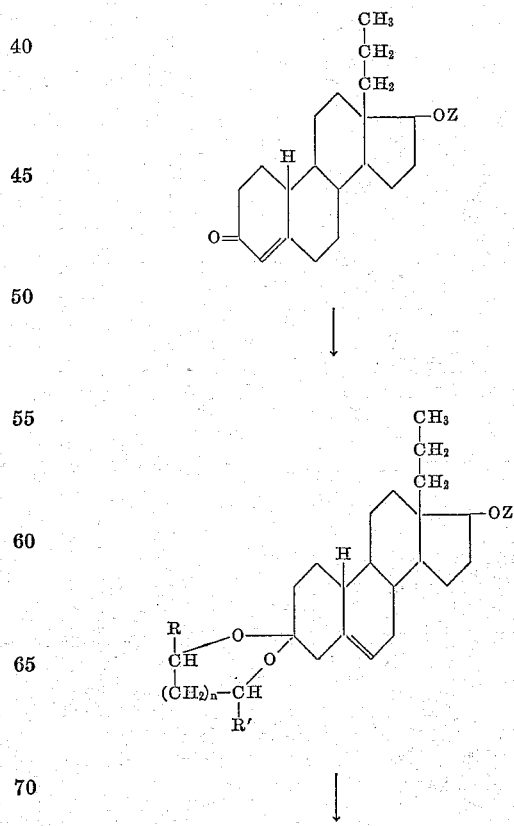

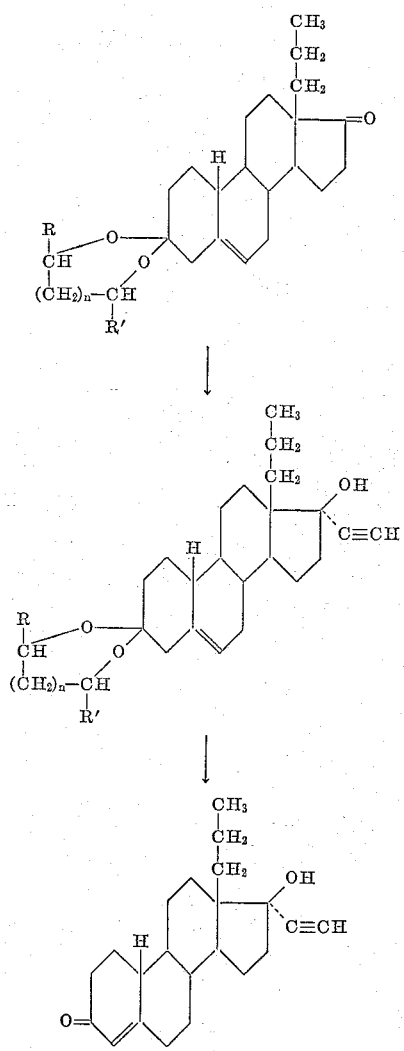

wherein Z is selected from the group consisting of hydrogen and an acyl radical of an organic carboxylic acid having 1 to 18 carbon atoms, R and R' are selected from the group consisting of hydrogen and an alkyl radical having 1 to 8 carbon atoms and $n$ is an integer selected from the group consisting of 0 and 1.

A preferred mode of the process of the invention comprises reacting 17β-benzolyloxy-18,19-di-nor - 13β - n - propyltestostirone with 2-methyl-2-ethyl-1,3-dioxolane in the presence of an acid catalyst to form the 3-ethylene ketal of 17β-benzolyloxy-18,19-di-nor-13β - n - propyltestosterone, saponifying the latter with an alkali metal hydroxide to form the 3-ethylene ketal of 18,19-di-nor-13β-n-propyl-testosterone, reacting the latter with cyclohexanone in the presence of aluminum isopropylate to form the 3-ethylene ketal of 13β-n-propyl-Δ⁴-gonene-3,17-dione, reacting the latter with a magnesium ethynyl halide such as the bromide or iodide to form the 3-ethylene ketal of 18,19-di-nor-13β-n-propyl-17α-ethynyl - testosterone, hydrolyzing the latter in the presence of an aqueous acid such as acetic acid or a mixture of acids such as acetic acid and perchloric acid to form 18,19-di-nor-13β-n-propyl-17α-ethynyl-testosterone and recovering the latter.

By the term "gonane" and its variations, we mean a compound having a fully hydrogenated cyclopentanophenanthrene nucleus and having the steric configuration of the natural steroids. The compounds may also be named as 18,19-di-nor-androstanes.

The starting materials for the process of the invention may be prepared according to the process described in our co-pending application Serial No. 96,062, filed January 19, 1961, now Pat. No. 3,115,507. The said process comprises reacting 6-methoxy-3,4-dihydronaphthyl-(2,1)-isoxazole with alkyl bromide to form 2-n-propyl-2-cyano-6-methoxy-tetralone-1, reacting the latter with dimethyl succinate to form 5-methoxy-13β-n-propyl-15-methoxy-carbonyl-Δ$^{5,7,9,14}$-des-A-gonatetraene-17-one, reacting the latter with an alkali metal borohydride to form 5-methoxy-13β - n - propyl - 15 - carboxy - Δ$^{5,7,9,14}$ - des - A - gonatetraene-17β-ol, resolving the latter into its optically active antipodes decarboxylating the levorotatory compound to form 5-methoxy-13β-n-propyl-Δ$^{5,7,9,14}$-des-A-gonatetraene-17β-ol, hydrogenating the latter to form 5-methoxy-13β-n-propyl-Δ$^{5,7,9}$-des-A-gonatriene-17β-ol, reducing the latter to form 13β-n-propyl-Δ⁹-des-A-gonene-17β-ol-5-one, esterifying the latter and reacting the latter to form 5-pyrrolidyl-13β-n-propyl-17β-acyloxy-Δ$^{5(10),9(11)}$-des - A-gonadiene, reacting the latter with a 1,3-dihalo-2-butene and then hydrolyzing to form 13β-n-propyl-17β-acyloxy-4,5-seco-Δ9-gonene-3,5-dione, reducing the latter to form 13β-n-propyl-17β-acyloxy-4,5-seco-gonane-3,5-dione and cyclizing the latter to form 18,19-di-nor-13β-n-propyl-17β-acyloxytestosterone which may be hydrolyzed to the free alcohol if desired.

The 17β-acyloxy group may be derived from an organic carboxylic acid having 1 to 18 carbon atoms. The said acids may be alkanoic acids or alkenoic acids such as acetic acid, trimethylacetic acid, propionic acid, 4,4-dimethyl-pentanoic acid, 10-undecenoic acid; cycloalkyl alkanoic acids such as β-cyclopentyl-propionic acid; arylalkanoic acids such as phenyl propionic acid; cycloalkanoic acids such as hexahydrobenzoic acid and hexahydroterephthalic acid; and phenyl carboxylic acid such as benzoic acid and 3,5-dinitrobenzoic acid.

In the following example there are described several preferred embodiments to illustrate the invention. However, it should be understood that the invention is not intended to be limited to the specific embodiments.

EXAMPLE

*Preparation of 18,19-Di-Nor-13β-n-Propyl-17α-Ethynyl-Testosterone*

STEP A.—PREPARATION OF THE 3-ETHYLENE KETAL OF 17β-BENZOYLOXY - 18,19 - DI-NOR-13β-n-PROPYL-TESTOSTERONE 2 gm. of 17β-benzoyloxy - 18,19 - di-nor - 13β-n-propyl testosterone (obtained according to United States patent application Serial No. 96,062) were introduced into 40 cc. of 2-methyl-2-ethyl-1,3-dioxolane. 40 mg. of p-toluene sulfonic acid were added and the mixture was heated to reflux for a period of 2 hours. After cooling, the mixture was poured into a dilute aqueous solution of sodium-bicarbonate. This solution was extracted with methylene chloride. The extracts were combined, washed with water, dried and evaporated to dryness under vacuum.

The raw 3-ethylene ketal of 17β-benzoyloxy-18,19-di-nor-13β-n-propyl-testosterone was obtained which was utilized without further purification for the next step of the synthesis.

This product is not described in the literature.

STEP B.—PREPARATION OF THE 3-ETHYLENE KETAL OF 18,19-DI-NOR-13β-n-PROPYL-TESTOSTERONE

A mixture of 2.390 gm. of the 3-ethylene ketal of 17β-benzoyloxy-18,19-di-nor-13β-n-propyl-testosterone, 48 cc. of methanol and 12 cc. of 10% potassium hydroxide in methanol was heated to reflux. The heating under an atmosphere of nitrogen was continued for a period of 4 hours. Next the solution was concentrated to a small volume and poured into water. The precipitate was vacuum filtered, washed with water and dried. The product was subjected to chromatography over magnesium silicate with elution with methylene chloride.

The 3-ethylene ketal of 18,19-di-nor-13β-n-propyl-testosterone was obtained which upon recrystallization from petroleum ether gave a product melting at 108–109° C. It occurred in the form of white needles, very soluble in acetone, benzene and chloroform, soluble in ether and alcohol, and insoluble in water.

This compound is not described in the liaterature.

STEP C.—PREPARATION OF THE 3-ETHYLENE KETAL OF 13β-n-PROPYL-Δ⁴-GONENE-3,17-DIONE 0.980 gm. of the 3-ethylene ketal of 18,19-di-nor-13β-n-propyl-testosterone were dissolved in 130 cc. of anhydrous toluene in an atmosphere of nitrogen. 17 cc. of cyclohexanone were added. The mixture was heated to the boiling point and 0.800 gm. of aluminum isopropylate in solution in 75 c. of anhydrous toluene were added in small fractions over a period of 2½ hours while distilling off during the same period an equal volume of toluene. The heating was continued for a period of a half hour at reflux. After cooling, 5 gm. of the double tartrate of sodium and potassium were added. The solution was dissolved in 50 cc. of an aqueous solution containing 5% sodium bicarbonate. The aqueous layer was extracted with ether. The ethereal extracts were combined, washed with water, dried and evaporated to dryness under vacuum. The residue was subjected to chromatography over magnesium silicate and elution with methylene chloride.

The 3-ethylene ketal of 13β-n-propyl-Δ⁴-gonene-3,17-dione was obtained having a melting point of 136° C. It occurred in white prismatic crystals, very soluble in acetone, benzene and chloroform, soluble in ether and insoluble in water.

This compound is not described in the literature.

STEP D.—PREPARATION OF THE 3-ETHYLENE KETAL OF 18,19-DI-NOR-13β-n-PROPYL-17α-ETHYNYL-TESTOSTERONE 2.5 gm. of magnesium turnings were introduced into 40 cc. of anhydrous ether and a current of dry methyl bromide was allowed to bubble through the ether until the magnesium disappeared. 14 cc. of the ethereal solution of magnesium methyl bromide thus obtained were introduced into 45 cc. of anhydrous tetrahydrofuran and were subjected to the bubbling therethrough of a stream of acetylene for a period of three hours at 30° C.

0.200 gm. of the 3-ethylene ketal of 13β-n-propyl-Δ⁴-gonene-3,17-dione were added and the mixture was heated to the boiling point under a current of acetylene for a period of 2 hours. After cooling, the magnesium compound was decomposed by an aqueous solution of ammonium chloride. The aqueous phase was extracted with ether and the ethereal extracts were combined, washed with water, dried and evaporated to dryness under vacuum. The residue was subjected to chromatography over magnesium silicate with elution with methylene chloride.

The 3-ethylene ketal of 18,19-di-nor-13β-n-propyl-17α-ethynyl-testosterone was obtained melting at 168° C. This was a white crystalline product, soluble in the usual organic solvents, such as ether, acetone, benzene and chloroform, and insoluble in water.

This compound is not described in the literature.

STEP E.—PREPARATION OF 18,19-DI-NOR-13β-n-PROPYL-17α-ETHYNYL-TESTOSTERONE 4 cc. of pure acetic acid were mixed with 0.4 cc. of a 65% solution of perchloric acid. 0.185 gm. of the 3-ethylene ketal of 18,19-di-nor-13β-n-propyl-17α-ethynyl testosterone were added under an atmosphere of nitrogen and the solution was allowed to stand in a closed vessel for a period of 30 minutes at room temperature. The mixture was next poured into an aqueous solution saturated with sodium bicarbonate. The precipitated product was vacuum filtered, washed with water, dried and subjected to chromatography over magnesium silicate. Elution with methylene chloride containing 3% ether furnished 18,19-di-nor-13β-n-propyl-17α-ethylnyl-testosterone having a melting point of 184° C. and a specific rotation $[\alpha]_D^{20} = -27°$ (c.=0.38% in methanol).

The product occurred in the form of white prismatic crystals, very soluble in chloroform, soluble in ether and insoluble in water.

Analysis.—$C_{22}H_{30}O_2$; molecular weight=326.46. Calculated: C, 80.93%; H, 9.26%. Found: C, 80.9%; H, 9.0%.

This compound is not described in the literature.

PROGESTOMIMETIC ACTIVITY DETERMINATION

The progestomimetic activity of 18,19-di-nor-13β-n-proply-17α-ethynyl-testosterone was determined by the Clauberg test practiced on immature rabbits previously made sensitive by the administration of 10 gammas of the 17-benzoate of estradiol per day for a period of 5 days.

18,19-di-nor-13β-n-propyl-17α - ethylnyl - testosterone was administered in suspension in a 5% carboxy-methyl cellulose solution by oral methods for a period of 5 days at a dose of 2 mg. This test was practiced while operating for comparison with the 17α-ethynyl-19-nor-testosterone, utilizing the same dose. The animals were sacrificed on the 6th day and the lacy proliferation of the endometrium characteristic of the progestomimetic action was noted on the sections of the uterus. One could thus conclude that 18,19-di-nor-13β-n-propyl-17α-ethynyl-testosterone manifests a clear progestomimetic action at least equal to that of 17α-ethynyl-19-nor-testosterone. It possessed the advantage of not having a secondary estrogenic effect which 17α-ethynyl-19-nor-testosterone does possess.

ESTROGENIC ACTIVITY DETERMINATION 18,19-di-nor-13β-n-propyl-17α-ethynyl-testosterone and 17α-ethynyl-19-nor-testosterone were respectively administered by oral methods for a period of 10 days in daily doses of 238 gammas and 217 gammas (doses which correspond to 200 gammas of 19-nor-testosterone) to adult castrated rats weighing about 140 grams. Whereas the 17α-ethynyl-19-nor-testosterone produced a vaginal mucification caused by estrogenic activity, 18,19-di-nor-13β-n-propyl-17α-ethynyl-testosterone is at the dosage utilized devoid of all estrogenic effect.

Various modifications of the process and method of the invention may be made without departing from the spirit or scope thereof, and it is to be understood that the invention is to be limited only as defined in the appended claims.

We claim:

1. 18,19-di-nor-13β-n-propyl-17α-ethynyl-testosterone.
2. A compound having the formula

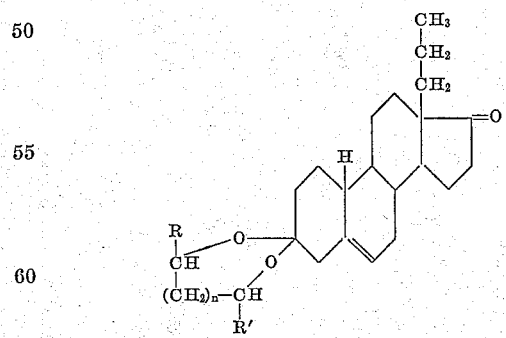

wherein R and R' are selected from the group consisting of hydrogen and alkyl radicals having 1 to 8 carbon atoms and $n$ is an integer from 0 to 1.

3. The 3-ethylene ketal of 13β-n-propyl-Δ⁴-gonene-3,17-dione.

4. A process for the preparation of 18,19-di-nor-13β-n-propyl-17α-ethynyl-testosterone which comprises reacting a compound selected from the group consisting of 18,19-di-nor-13β - n - propyl - testosterone and the hydrocarbon carboxylic acid esters thereof, said acids having 1 to 18 carbon atoms, with a di-lower alkyl dioxolane to form the corresponding 3-alkylene ketal, subjecting the 3-alkylene ketal of 18,19-di-nor-13β-n-propyl-testosterone to the action of a dehydrogenating agent to form the 3-alkylene ketal of 13β-n-propyl-Δ⁴-gonene-3,17-dione, ethynylating the latter to form the 3-alkylene ketal of 18,19-di-nor-13β-n-propyl-17α-ethynyl-testosterone, hydrolyzing the latter under aqueous acidic conditions to form 18,19-di-nor-13β-n-propyl-17α-ethynyl-testosterone and recovering the latter.

5. The process of claim 4 wherein the di-lower alkyl dioxolane is methyl ethyl dioxolane and the reaction is effected in the presence of an acid catalyst.

6. The process of claim 4 wherein the dehydrogenating agent is cyclohexanone in the presence of aluminum isopropylate.

7. The process of claim 4 wherein the ethynylation is effected with a magnesium ethynyl halide.

8. The process of claim 4 wherein the hydrolysis is effected with an aqueous mixture of acetic acid and perchloric acid.

9. A process for the preparation of 18,19-di-nor-13β-n-propyl-17α-ethynyl-testosterone which comprises reacting 17β-benzoyloxy-18,19-di-nor-13β-n-propyl-testosterone with methyl ethyl dioxolane in the presence of an acid catalyst to form the 3-ethylene ketal of 17β-benzoyloxy-18,19-di-nor-13β-n-propyl-testosterone, saponifying the latter with methanolic potassium hydroxide to form the 3-ethylene ketal of 18,19-di-nor-13β-propyl-testosterone, reacting the latter with cyclohexanone in the presence of aluminum isopropylate to form the 3-ethylene ketal of 13β-n-propyl-Δ⁴-gonene-3,17-dione, reacting the latter with magnesium ethynyl bromide to form the 3-ethylene ketal of 18,19-di-nor-13β-n-propyl-17α-ethynyl-testosterone, hydrolyzing the latter with an aqueous mixture of acetic acid and perchloric acid to form 18,19-di-nor-13β-n-propyl-17α-ethynyl-testosterone and recovering the latter.

10. A composition having progestomimetic activity consisting of 5 to 10 mg. of 18,19-di-nor-13β-n-propyl-17α-ethynyl-testosterone and a non-toxic vehicle.

References Cited in the file of this patent
UNITED STATES PATENTS

| | | |
|---|---|---|
| 2,774,777 | Djerassi et al. | Dec. 18, 1956 |
| 3,012,045 | Colton et al. | Dec. 5, 1961 |
| 3,069,436 | Kerb et al. | Dec. 18, 1962 |

OTHER REFERENCES

Velluz et al.: Tetrahedron Letters, No. 3, March 1961, pages 127–130 relied on.

Notice of Adverse Decision in Interference

In Interference No. 95,443 involving Patent No. 3,152,956, G. Nomine, R. Bucourt and A. Pierdet, 18, 19-DI-NOR-13β-n-PROPYL-17α-ETHYNYL-TESTOSTERONE AND PREPARATION THEREOF, final judgment adverse to the patentees was rendered May 16, 1969, as to claims 1 and 10.
[*Official Gazette January 13, 1970.*]